June 2, 1964  E. S. CRUZ ETAL  3,135,335
HELICOPTER ROTOR SYSTEM
Filed Dec. 31, 1962  4 Sheets-Sheet 1

INVENTORS
EDWARD S. CRUZ
ALBERT R. YACKLE
By
Agent

FIG_2

June 2, 1964  E. S. CRUZ ETAL  3,135,335
HELICOPTER ROTOR SYSTEM
Filed Dec. 31, 1962  4 Sheets-Sheet 3

INVENTORS
EDWARD S. CRUZ
ALBERT R. YACKLE
By
Agent

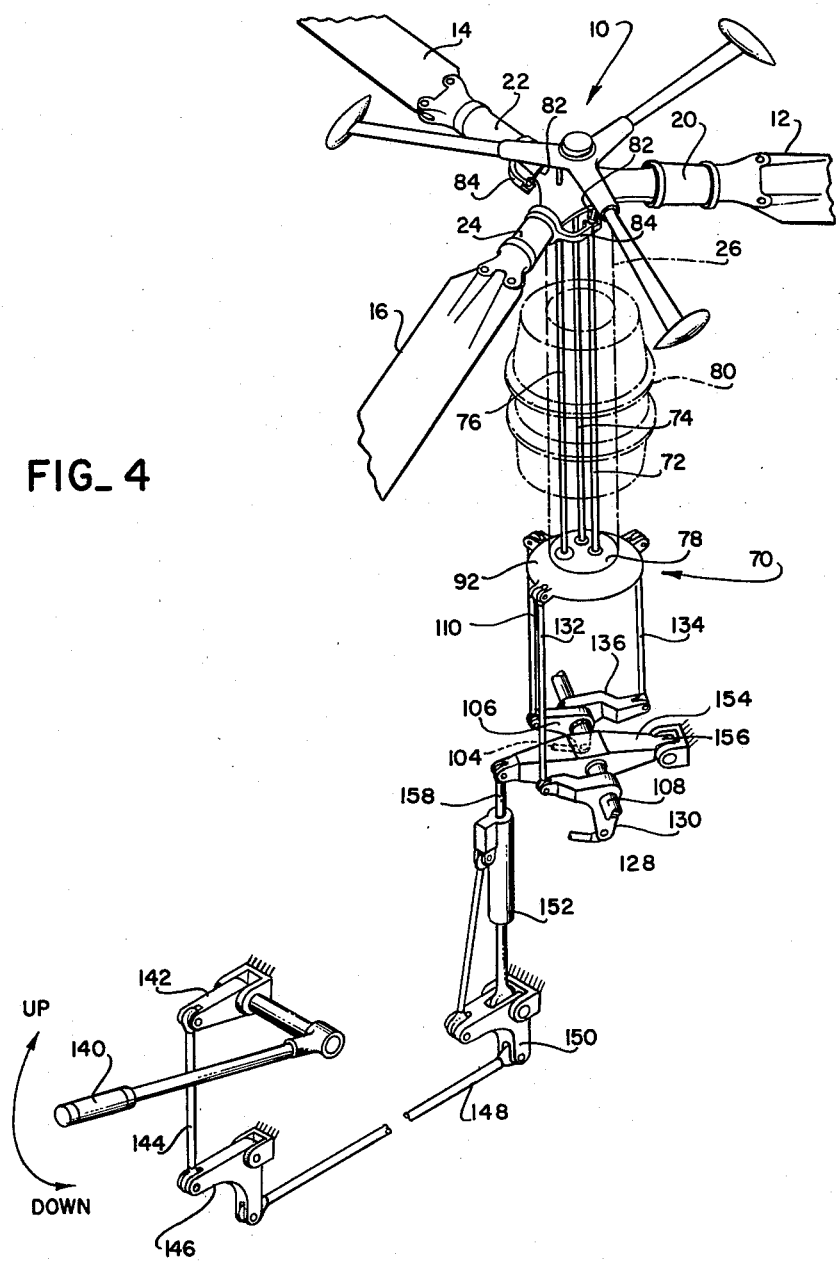

United States Patent Office
3,135,335
Patented June 2, 1964

3,135,335
HELICOPTER ROTOR SYSTEM
Edward S. Cruz, Van Nuys, and Albert R. Yackle, East Woodland Hills, Calif., assignors to Lockheed Aircraft Corporation, Burbank, Calif.
Filed Dec. 31, 1962, Ser. No. 248,375
3 Claims. (Cl. 170—160.13)

This invention relates to a helicopter rotor system, and more particularly to the rotor control means.

It is a general object of the present invention to provide a rotor system which is an improvement over the rotor control system described and claimed in copending application Serial Number 167,878, filed January 22, 1962, now Patent No. 3,106,964, entitled Helicopter Rotor, and assigned to the same assignee as the instant invention. The rotor therein described is of the type, commonly referred to as a rigid rotor, which utilizes cantilevered, non-articulated blades which are rigidly attached to the rotor shaft. These blades are slaved to a control gyro consisting of laterally extending cross arms with end weights having aerodynamic lift surfaces. The cross arms are integral with the swashplate, and this control gyro-swashplate assembly is mounted on the rotor drive shaft between the helicopter body and the blades. The control gyro together with the gyroscopic characteristics of a rigid rotor provides for a high inherent stability of the rotor. The control gyro also receives pilot control inputs and transmits them to the rotor blades, which respond by appropriate changes in blade pitch.

More specifically, it is an object of the present invention to provide a rotor control system which presents less drag and therefore is aerodynamically cleaner than the rotor system just described. Such a reduction in drag results in a greater forward speed.

It is another object of the present invention to provide a control gyro-swashplate arrangement which has less weight than the rotor system previously described.

It is another object of the present invention to provide a relatively shorter rotor shaft length and therefore a more compact rotor system than the rotor previously described.

It is another object of the present invention to provide a means for adjusting the phase angle between the cross arms of the control gyro and the rotor blade.

It is another object of the present invention to provide a constant velocity universal joint between the control gyro and the rotor shaft so that undesirable control oscillations and vibratory loads relative to the control gyro are eliminated.

These and other objects and advantages of the present invention will become more apparent in the following detailed description taken in conjunction with the accompanying drawings wherein:

FIGURE 4 is a schematic diagram of the collective pitch control system in accordance with the present invention.

Figure 1:
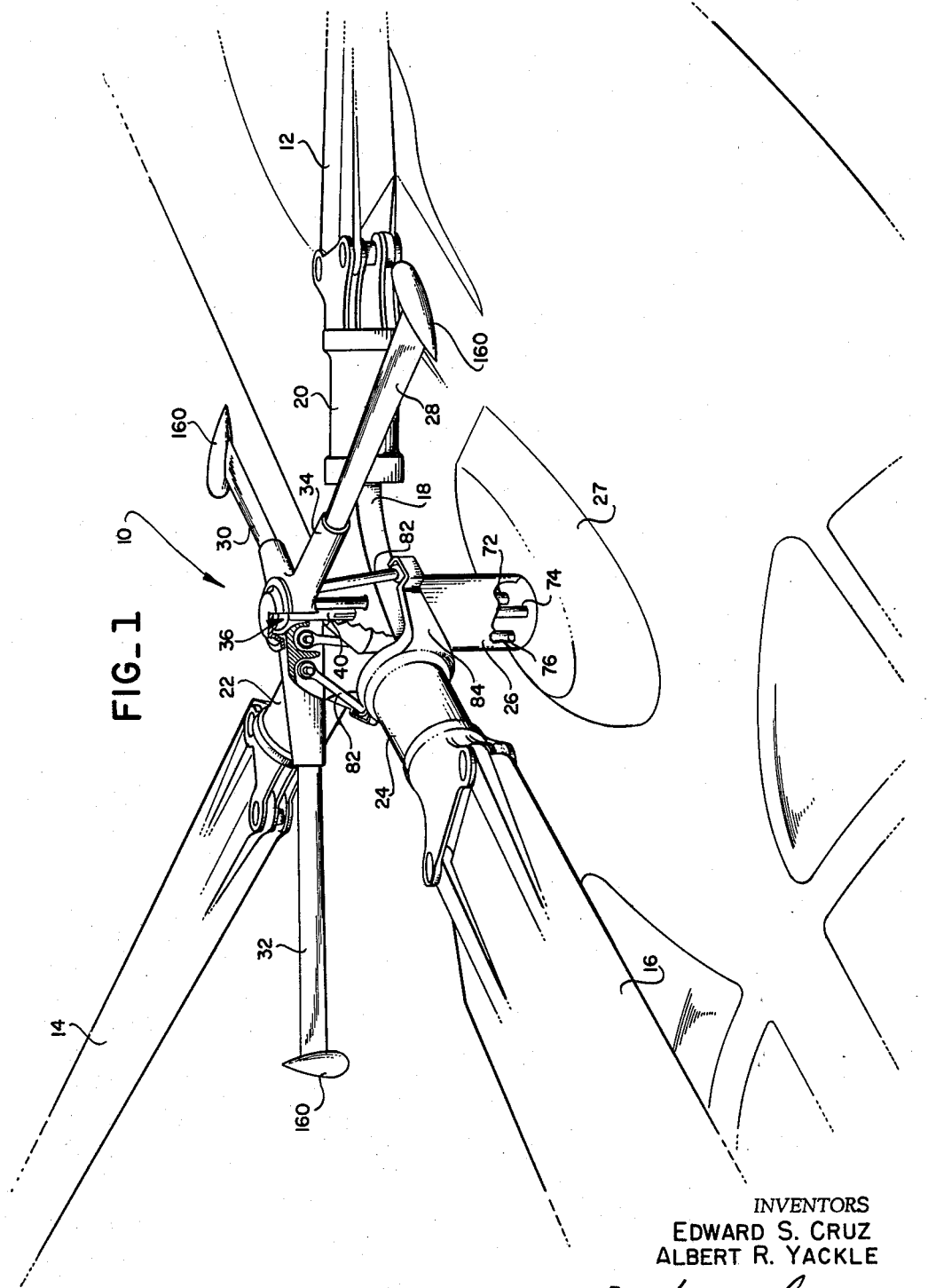
FIGURE 1 is a perspective view of the rotor blades and control gyro in accordance with the present invention, portions thereof being removed or broken away to show internal structure.

FIGURE 1 shows a helicopter rotor system 10 of the rigid rotor type wherein non-articulated rotor blades 12, 14 and 16 are connected to a rotor hub 18 through cuff members 20, 22, and 24 respectively. The cuff members carry the bearings for changing blade pitch. Hub 18 is rigidly connected to the rotor mast or drive shaft 26, shown protruding above the fairing 27.

The control gyro comprises three radially extending cross arms 28, 30, 32, connected to a three-spoke hub 34 disposed above the rotor blades and rotating therewith by means of a constant velocity universal joint, generally shown as 36. The cross arms are disposed between the respective blades at a predetermined phase angle in a manner to be described more specifically hereinafter. By separating the control gyro from the swashplate and by placing the gyro above the blades so that the cross arms rotate almost within the rotor plane, it will be seen that the rotor shaft can be made shorter than in the embodiment shown in the copending application; that is, the clearance or space now required for tilting or precession of the control gyro is within the clearance required for precession of the rotor, whereas in the previous embodiment, wherein the control gyro was disposed between the blades and the helicopter body, a greater clearance and thus a longer rotor shaft had to be provided for control gyro precession. The shorter, more compact rotor shaft of the present invention results in a reduction in aerodynamic drag and a saving in total weight of the rotor system.

Figure 2:
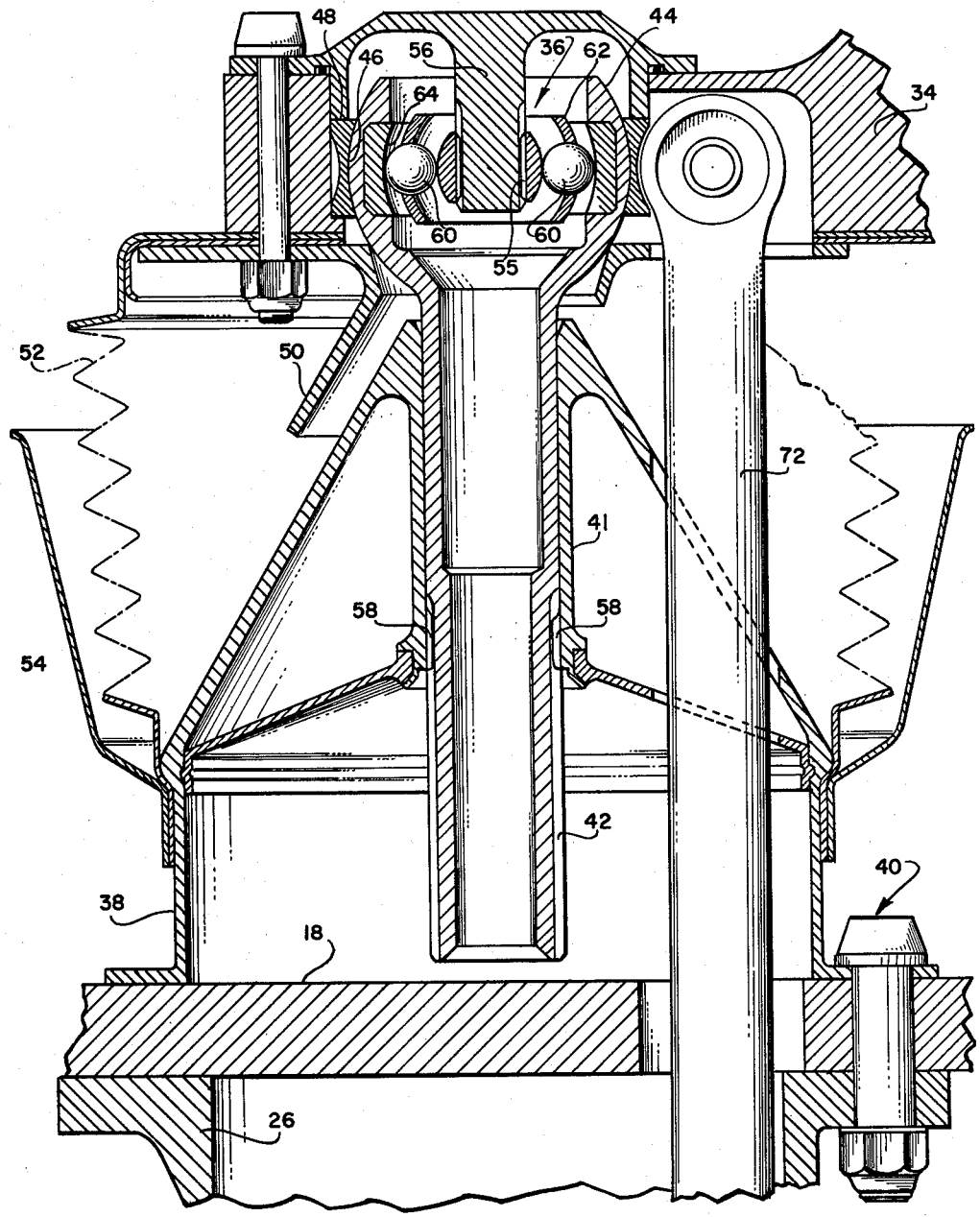
FIGURE 2 is an enlarged, elevational view in section of the gyro support means, the constant velocity universal joint, and support enclosure in accordance with the present invention.

FIGURE 2 shows more clearly the manner in which the control gyro is mounted above the rotor blades and the manner in which the drive shaft torque is transmitted through the constant velocity joint 36 to the gyro. A frustro-conical support 38 is centrally disposed above the drive shaft 26 and is mounted on the rotor hub 18 by suitable mount means 40. Support 38 has a central column 41 adapted to receive a splined spindle 42 which is movable vertically in support 38 and has a spherical end 44. A concave bearing surface 46 in a collar 48 carried by hub 34 is adapted to ride on end 44 for universal tilting movement of gyro hub 34. Stop means 50 attached to gyro hub 34 cooperates with support 38 to limit the tilting movement of the gyro. To reduce the aerodynamic drag in the area of the gyro mount means, a circular bellows member 52 is provided between the gyro hub 34 and support 38, and a circular shield 54 on support 38 further reduces the drag.

Joint 36 fits into end 44, as shown, and has a central splined opening 55. Gyro hub 34 is connected to joint 36 by means of a central splined shaft 56 in fixed engagement with opening 55. Generally, this connection is made so that the gyro cross arms lead the respective blades by an angle ranging from about 30° to about 60°, with about 45° being the preferred angle. The spline connection between gyro hub 34 and joint 36 affords an easy and quick means for obtaining the proper phase angle between the blades and the cross arms.

The drive shaft torque is transmitted through support 38 into spindle 42 through splines 58 and thence into gyro hub 34 through joint 36. In joint 36, the drive shaft torque is transmitted through hardened steel balls 60 held in a cage 62, each ball rolling in separate arcuated raceway grooves 64. Constant velocity is achieved by the ball groove geometry which maintains the balls 60 and cage 62 in a half angle position at all times; that is, the grooves always compel the balls and cage to lie in a plane which bisects the angle between spindle 42 and central shaft 56 when gyro hub 34 is tilted with respect to spindle 42. By maintaining the balls in the correct bisecting plane at all times, true constant velocity motion is achieved. Joint 34 is of the type known commercially as the Rzeppa Constant Velocity Universal Joint, which is manufactured by the Dana Corporation of Detroit, Michigan. It will be apparent to those skilled in the art that other types of constant velocity joints, such as an angle-bisecting scissors joint, may also be used.

Figure 3:
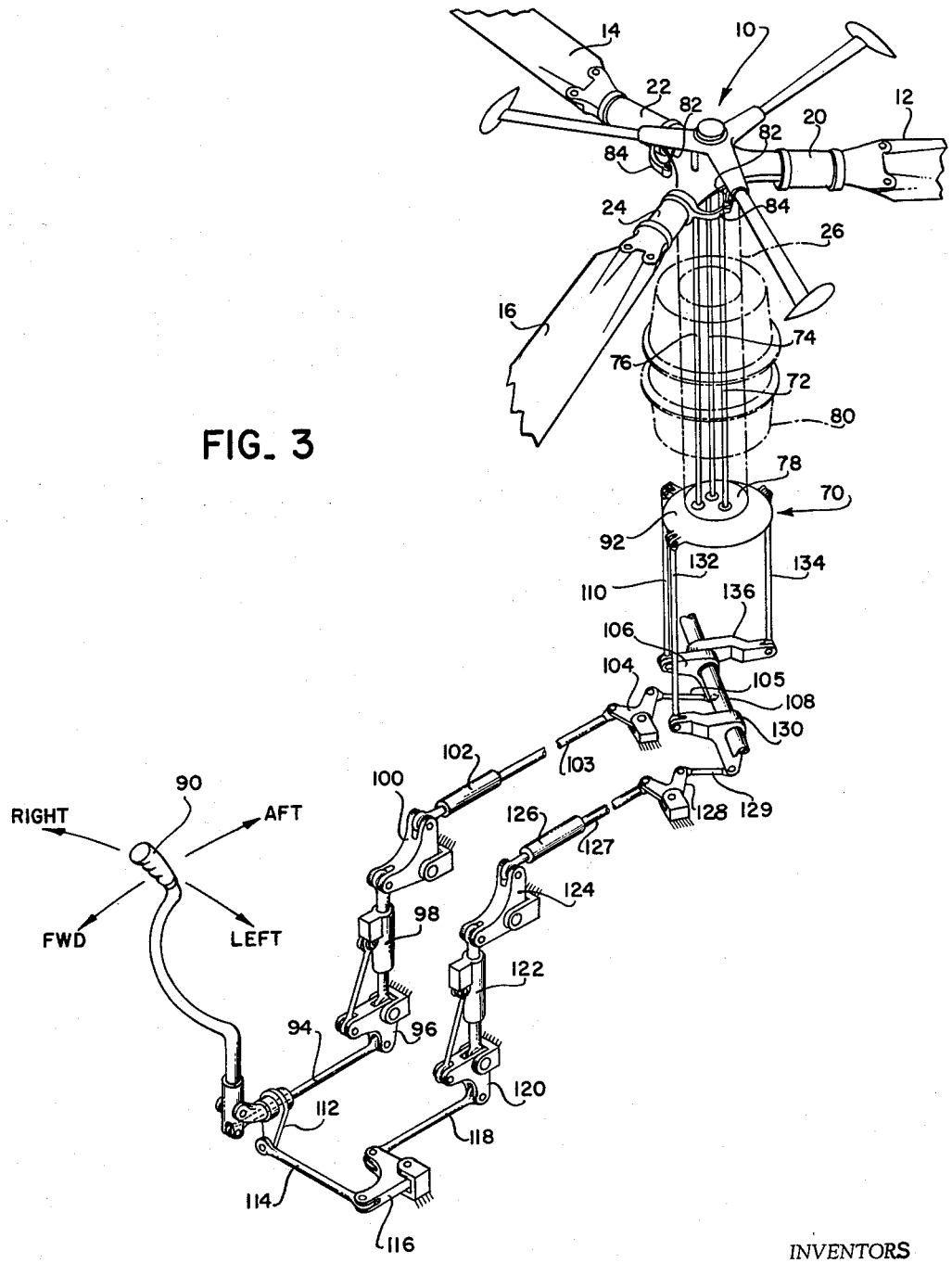
FIGURE 3 is a schematic diagram of the cyclic pitch control system in accordance with the present invention.

As shown in FIGURES 2, 3, and 4, pilot control inputs are transmitted from the swashplate, shown generally as 70, to the control gyro by cyclic and collective control rods 72, 74, and 76, pivotably connected to the gyro hub 34 and to the rotating portion 78 of swashplate 70. These rods are contained within the rotor drive shaft 26, shown in phantom, thereby reducing the aerodynamic drag which would otherwise be produced by external linkages. The control inputs transmitted by the control rods cause the control gyro to tilt or precess. This precession causes the blade pitch links 82, pivotably connected to the gyro hub and to the blade pitch horns 84 on each of the cuff members 20, to cyclically change the blade pitch. The providing of three control rods 72, 74, and 76, from the swashplate to the control gyro results in a fail-safe feature in that if any one of these rods should fail, the remaining two rods will still be able to carry the control inputs to the gyro.

It will be noted in FIGURES 3 and 4 that swashplate 70 is disposed below drive shaft 26 and transmission housing 80, shown in phantom, and is relatively close to the linkage means. In contrast to the embodiment shown in the afore-mentioned copending application wherein the swashplate is mounted on the drive shaft, swashplate 70 is now reduced in size because it no longer must allow for the diameter of the drive shaft. This decrease in size results in important savings in total weight of the rotor control system.

As shown in FIGURE 3, cyclic pitch control is obtained by actuating cyclic pitch stick 90 forward or rearwardly depending upon whether a nose-down or nose-up response is desired. Assume for explanatory purposes that the helicopter is hovering and that the stick is pushed forwardly for a nose-down response. This force, or control input, is then transmitted to the non-rotating portion 92 of the swashplate 70 by a suitable system of bell cranks and linkages. In the system shown, the force from the stick is transmitted through rod 94, bell crank 96, hydraulic booster 98, bellcrank 100, spring cartridge 102, rod 103, bellcrank 104, rod 105, bellcrank 106 pivotally mounted on torque tube 108, and rod 110 pivotally connected to the non-rotating portion 92 of swashplate 70. This force is then transmitted to the rotating portion 78 of the swashplate in the usual manner and then to the control gyro through the control rods 72, 74, 76, in the form of a rolling moment to the right on the control gyro. The gyro precesses in a nose-down direction, causing cyclic pitch change of the blades through links 82 and horns 84. The force input to the blades and the difference in aerodynamic lift moments produced between the advancing and retreating blades cause the rotor plane to precess also in a nose-down direction. The forward tilt of the rotor plane results in forward movement of the helicopter.

Cyclic roll control is achieved in a similar manner by actuating cyclic pitch stick 90 to the left or the right. Assume for explanatory purposes that the helicopter is hovering and that the stick is moved to the right. This force, or control input, is transmitted to the non-rotating portion 92 of the swashplate 70 by a system of bellcranks and linkages similar to that previously described for cylic pitch control. In the system shown in FIGURE 3, the force to the right is transmitted through lever arm 112, rod 114, bellcrank 116, rod 118, bellcrank 120, hydraulic booster 122, bellcrank 124, spring cartridge 126, rod 127, bellcrank 128, rod 129, bellcrank 130 rigidly fixed to torque tube 108, and rod 132 to the non-rotating portion 92 of swashplate 70. Rod 132 is pivotably connected to portion 92 at a point 90° apart from the point at which pitch rod 110 is connected. Diametrically opposite to the point of connection of rod 132 is another pivotable connection for a rod 134 attached to a bellcrank 136 rigidly attached to torque tube 108. Bellcranks 130 and 136 are so arranged on tube 108 that rods 132 and 134 move in opposite directions; that is, an upward movement of rod 132 will be accompanied by a downward movement of rod 134. The control input is then transmitted to the rotating portion 78 of the swashplate in the usual manner and then to the control gyro through the rods 72, 74, and 76, in the form of a downward force on the rearmost position of the control gyro. The gyro precesses in a right-side down direction, causing cyclical pitch change of the blades through links 82 and horns 84. The force input to the blades and the difference in aerodynamic lift moments produced between the forwardly extending blade and the rearwardly extending blade cause the rotor plane to precesses also in a right-side down direction. This results in a lateral translation of the helicopter to the right.

As shown in FIGURE 4, collective pitch control is obtained by actuating collective pitch stick 140 up or down, depending upon whether an increase in blade pitch or a decrease is desired. Assume for explanatory purposes that the helicopter is hovering and that an increase in blade pitch is desired. The control input to obtain this response is transmitted through a suitable system of linkages to the swashplate 70. In the system shown in FIGURE 4, this control input is transmitted through lever arm 142, rod 144, bellcrank 146, rod 148, bellcrank 150, and hydraulic booster 152 to one end of lever arm 154. The latter arm is pivoted to the helicopter structure at the opposite end 156 and carries torque tube 108, as shown. Upward movement of stick 140 results in upward movement of actuator rod 158, lever arm 154, torque tube 108. This upward movement is transmitted to swashplate 70 by rods 110, 132 and 134 and to the control gyro by rods 72, 74, and 76. It will be noted in FIGURE 2 that vertical movement of the control gyro is provided for by bellows member 52 and the spline connection between shaft 42 and support 38. Upward movement of the gyro causes all blades to change pitch collectively through links 82 and horns 84, increasing their angle of attack. This results in increased lift.

The present control gyro not only transmits pilot control inputs to the rotor, but it also helps to stabilize the rotor. The stabilizing is obtained by utilizing the inherent resistance of a gyroscope to change its plane of rotation when acted upon by an external force. The rotor itself has gyroscopic properties since it is a rotating body and therefore will resist external forces. A rigid rotor system, such as the present invention, takes maximum advantage of these properties. However, if the rotor should be disturbed by external forces, the control gyro tends to stay in its plane of rotation and automatically supplies a counteracting force input to the blades, helping to stabilize the rotor.

With reference to FIGURE 1, the gyro cross arms carry weights 160 which have aerodynamic lift surfaces with a relatively high angle of attack. When the helicopter moves forwardly, a difference in lift is produced by the weights on the advancing and retreating sides, which difference increases with speed. The difference in lift will cause the gyro to precess nose-up and thus the vehicle to slow down if the speed is above the trim speed, or to precess nose-down and the vehicle to speed up if the speed is below the trim speed. This feature is called speed stability. By having the gyro disposed above the rotor blades, the weights move through relatively undisturbed air on top of the rotor, thus enhancing their speed stabilizing function.

Thus, a helicopter rotor control system has been described which is more compact, has less weight, and is aerodynamically cleaner than the system described in the afore-mentioned copending application.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A helicopter rotor system comprising: a rotor drive shaft; a rotor hub attached to the drive shaft; cuff members pivotably attached to the hub and carrying bearings and pitch control horns for blade pitch change; non-articulated rotor blades attached to said cuff members; a rotatably driven rotor control gyro having a gyro hub and a plurality of weighted cross arms extending radially from the gyro hub and being in acute angle relationship with the respective blades; means for supporting the gyro hub above the blades for universal tilting movement and for vertical movement of the gyro with respect to the drive shaft; linkage means directly connecting the gyro hub and the pitch control horns on the cuff members for changing blade pitch upon relative displacement of the gyro and rotor planes; a swashplate disposed below the drive shaft; and control rods connecting the swashplate with the control gyro, said rods being contained within the rotor drive shaft.

2. A helicopter rotor system comprising: a rotor drive shaft; a rotor hub attached to the drive shaft; cuff members pivotably attached to the hub and carrying bearings and pitch control horns for blade pitch change; non-articulated rotor blades attached to said cuff members; a rotor control gyro having a gyro hub and a plurality of weighted cross arms extending radially from the gyro hub and being in acute angle relationship with the respective blades; means for supporting the gyro hub above the blades for universal tilting movement and for vertical movement of the gyro with respect to the drive shaft; linkage means directly connecting the gyro hub and the pitch control horns on the cuff members for changing blade pitch upon relative displacement of the gyro and rotor planes; means in said support for transmitting drive shaft torque to said gyro to drive said gyro at a constant velocity; a swashplate disposed below the drive shaft; and control rods connecting the swashplate with the control gyro, said rods being contained within the rotor drive shaft.

3. A helicopter rotor system comprising: a rotor drive shaft; a rotor hub attached to the drive shaft; cuff members pivotably attached to the hub and carrying bearings and pitch control horns for blade pitch change; non-articulated rotor blades attached to said cuff members; a rotor control gyro having a gyro hub and a plurality of weighted cross arms extending radially from the gyro hub and being in acute angle relationship with the respective blades; means for supporting said gyro above said blades, said support means including a frustro-conical support centrally disposed above said blades and having a central, internal column with a splined aperture, and a splined spindle fitting into said column for vertical movement therein and having a spherical end portion protruding above said support; a collar carried by said gyro hub and having a spherical surface cooperating with said spherical end portion for universal tilting movement of said gyro; a Rzeppa constant velocity universal joint in said spherical end portions for transmitting drive shaft torque to said gyro; linkage means directly connecting the gyro hub and pitch control horns on the cuff members for changing blade pitch upon relative displacement of the gyro and rotor planes; a swashplate disposed below the drive shaft; and control rods connecting the swashplate with the control gyro, said rods being contained within the rotor drive shaft.

References Cited in the file of this patent

UNITED STATES PATENTS

| | | |
|---|---|---|
| 2,519,762 | Hoffman | Aug. 22, 1950 |
| 3,007,530 | Doman | Nov. 7, 1961 |
| 3,027,948 | Goland | Apr. 3, 1962 |
| 3,080,001 | Culver | Mar. 5, 1963 |